(12) United States Patent
Hough et al.

(10) Patent No.: US 7,869,426 B2
(45) Date of Patent: Jan. 11, 2011

(54) INTELLIGENT PATCHING SYSTEM AND METHOD

(75) Inventors: Stephen Hough, Gloucestershire Tewkesbury (GB); Karl Tryner, Tewkesbury Alderton (GB)

(73) Assignee: ADC GmbH, Berlin (DE)

( * ) Notice: Subject to any disclaimer, the term of this patent is extended or adjusted under 35 U.S.C. 154(b) by 896 days.

(21) Appl. No.: 11/725,182

(22) Filed: Mar. 16, 2007

(65) Prior Publication Data

US 2007/0230452 A1    Oct. 4, 2007

Related U.S. Application Data

(60) Provisional application No. 60/785,410, filed on Mar. 22, 2006.

(51) Int. Cl.
*H04L 12/50* (2006.01)
(52) U.S. Cl. .................. 370/360; 340/687; 362/253; 439/709
(58) Field of Classification Search .......... 370/252; 340/687; 362/253; 439/709, 491
See application file for complete search history.

(56) References Cited

U.S. PATENT DOCUMENTS

| | | |
|---|---|---|
| 4,840,568 A | 6/1989 | Burroughs et al. |
| 5,161,988 A | 11/1992 | Krupka |
| 5,199,878 A | 4/1993 | Dewey et al. |
| 5,305,405 A | 4/1994 | Emmons et al. |
| 5,393,249 A | 2/1995 | Morgenstern et al. |
| 5,394,503 A | 2/1995 | Dietz, Jr. et al. |
| 5,418,334 A | 5/1995 | Williams |
| 5,419,717 A | 5/1995 | Abendschein et al. |
| 5,448,675 A | 9/1995 | Leone et al. |
| 5,467,062 A | 11/1995 | Burroughs |
| 5,473,715 A | 12/1995 | Schofield et al. |
| 5,483,467 A | 1/1996 | Krupka et al. |
| 5,494,461 A * | 2/1996 | Bippus et al. ............ 439/709 |
| 5,685,741 A | 11/1997 | Dewey et al. |
| 5,854,824 A | 12/1998 | Bengal et al. |
| 6,002,331 A | 12/1999 | Laor |
| 6,222,908 B1 | 4/2001 | Bartolutti et al. |
| 6,234,830 B1 * | 5/2001 | Ensz et al. ............ 439/491 |
| 6,285,293 B1 * | 9/2001 | German et al. ............ 340/687 |
| 6,300,877 B1 | 10/2001 | Schannach et al. |
| 6,330,307 B1 | 12/2001 | Bloch et al. |
| 6,350,148 B1 | 2/2002 | Bartolutti et al. |

(Continued)

FOREIGN PATENT DOCUMENTS

DE    10 2004 033 940 A1    2/2006

(Continued)

OTHER PUBLICATIONS

"The intelligent way to make Moves, Adds and Changes!," *Nordx/CDT*, 6 pages (2003).

(Continued)

*Primary Examiner*—Albert T Chou
(74) *Attorney, Agent, or Firm*—Merchant & Gould P.C.

(57) ABSTRACT

A telecommunications network manager includes a network scanner, a scanner interface unit, and intelligence activation units. The intelligence activation units are used with cable connection modules including insulation displacement contacts for connecting to cables. The intelligence activation units provide visual signals to a technician about which cable connection modules should be accessed during system set up or system maintenance.

20 Claims, 5 Drawing Sheets

U.S. PATENT DOCUMENTS

| | | | |
|---|---|---|---|
| 6,424,710 | B1 | 7/2002 | Bartolutti et al. |
| 6,456,768 | B1 | 9/2002 | Boncek et al. |
| 6,499,861 | B1 * | 12/2002 | German et al. .............. 362/253 |
| 6,522,737 | B1 | 2/2003 | Bartolutti et al. |
| 6,574,586 | B1 | 6/2003 | David et al. |
| 6,636,152 | B2 | 10/2003 | Schannach et al. |
| 6,743,044 | B2 | 6/2004 | Musolf et al. |
| 6,793,408 | B2 | 9/2004 | Levy et al. |
| 6,808,116 | B1 | 10/2004 | Eslambolchi et al. |
| 6,854,824 | B2 | 2/2005 | Sukigara |
| 6,898,368 | B2 | 5/2005 | Colombo et al. |
| D510,068 | S | 9/2005 | Haggay et al. |
| 6,961,675 | B2 | 11/2005 | David |
| 6,971,895 | B2 | 12/2005 | Sago et al. |
| 6,976,867 | B2 | 12/2005 | Navarro et al. |
| 7,081,808 | B2 | 7/2006 | Colombo et al. |
| 7,112,090 | B2 | 9/2006 | Caveney et al. |
| 7,123,810 | B2 | 10/2006 | Parrish |
| 7,226,217 | B1 | 6/2007 | Benton et al. |
| 7,234,944 | B2 | 6/2007 | Nordin et al. |
| 7,243,837 | B2 | 7/2007 | Durrant et al. |
| 7,297,018 | B2 | 11/2007 | Caveney et al. |
| 7,312,715 | B2 | 12/2007 | Shalts et al. |
| 7,352,289 | B1 | 4/2008 | Harris |
| 7,370,106 | B2 | 5/2008 | Caveney |
| 7,388,657 | B2 | 6/2008 | Abbott |
| 7,458,517 | B2 | 12/2008 | Durrant et al. |
| 7,479,032 | B2 | 1/2009 | Hoath et al. |
| 7,641,513 | B2 | 1/2010 | Hoath et al. |
| 7,736,160 | B2 | 6/2010 | Stockel |
| 2005/0186819 | A1 | 8/2005 | Velleca et al. |
| 2006/0160395 | A1 | 7/2006 | Macauley et al. |
| 2006/0160396 | A1 | 7/2006 | Macauley et al. |
| 2007/0117444 | A1 | 5/2007 | Caveney et al. |
| 2008/0309925 | A1 | 12/2008 | Abbott |
| 2009/0097846 | A1 | 4/2009 | Kozischek et al. |
| 2009/0166404 | A1 | 7/2009 | German et al. |
| 2009/0298323 | A1 | 12/2009 | Patchett |

FOREIGN PATENT DOCUMENTS

| | | |
|---|---|---|
| GB | 2 347 508 A | 9/2000 |
| GB | 2 347 751 A | 9/2000 |
| WO | WO 2006/048222 A1 | 5/2006 |

OTHER PUBLICATIONS

Meredith, L., "Managers missing point of intelligent patching," *Data Center News*, http://searchdatacenter.techtarget.com/news/article/0,289142,sid80_gci1099991,00.html, pp. 1-2 (Jun. 21, 2005).

Milligan, B., "Intelligent patching systems carving out a 'large' niche," Cabling Installation & Maintenance, http://cim.pennnet.com/display_article/207641/27/ARTCL/none/none/1/Intelligent-patchin..., pp. 1-6 (Jul. 2004).

Press Releases, "Avaya's Enhanced SYSTIMAX® iPatch System Enables IT Managers to Optimize Network Efficiency and Cut Downtime," *Avaya Inc.*, http://www.avaya.com/gcm/master-usa/en-us/corporate/pressroom/pressreleases/2003/pr-..., pp. 1-2 (May 9, 2003).

Press Releases, "Avaya's Enhanced SYSTIMAX® iPatch System Enables IT Managers to Optimise Network Efficiency and Cut Downtime," *Avaya Inc.*, http://www.avaya.com/gcm/master-usa/en-us/corporate/pressroom/pressreleases/2003/pr-..., pp. 1-2 (May 20, 2003).

Press Releases, "SYSTIMAX® iPatch System Wins Platinum Network of the Year Award," *Avaya Inc.*, http://www.avaya.com/gcm/master-usa/en-us/corporate/pressroom/pressreleases/2003/pr-..., pp. 1-2 (Jan. 30, 2003).

RiT Connect & Control, IPLMS Components, pp. 1-83 (Aug. 2005).

"Spec Sheet—TrueNet® CopperTen Modules," *ADC Krone*, Issue 2, 2 pages (Copyright 2006).

Truskett et al., U.S. Appl. No. 12/713,864, filed Feb. 26, 2010, titled "Labelling Assembly."

* cited by examiner

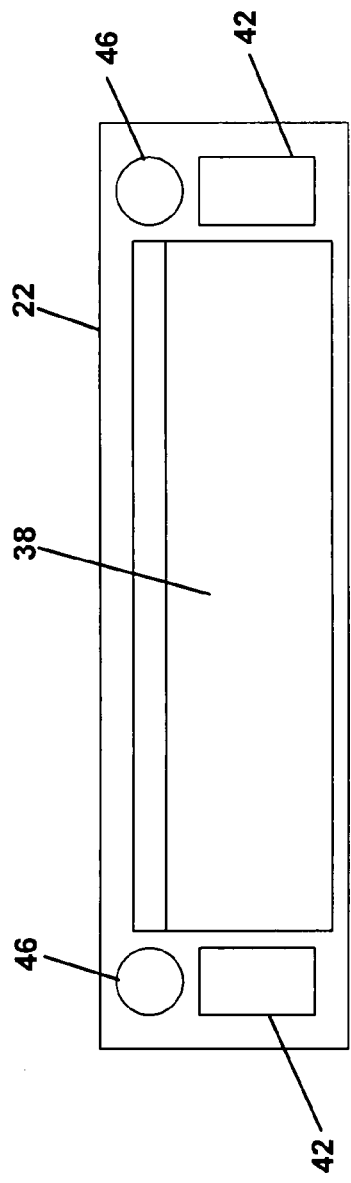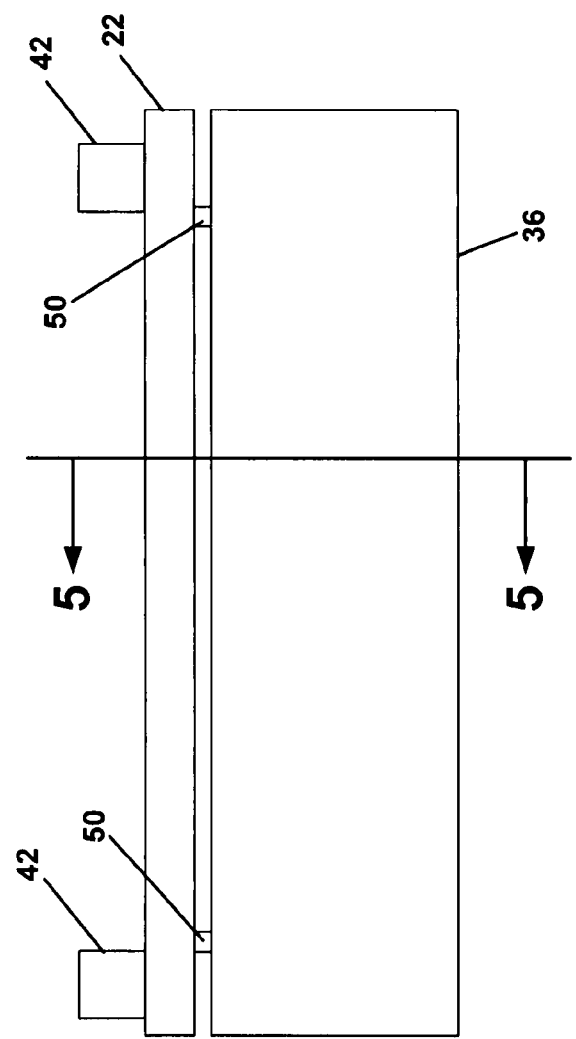
FIG. 3A
FIG. 3B

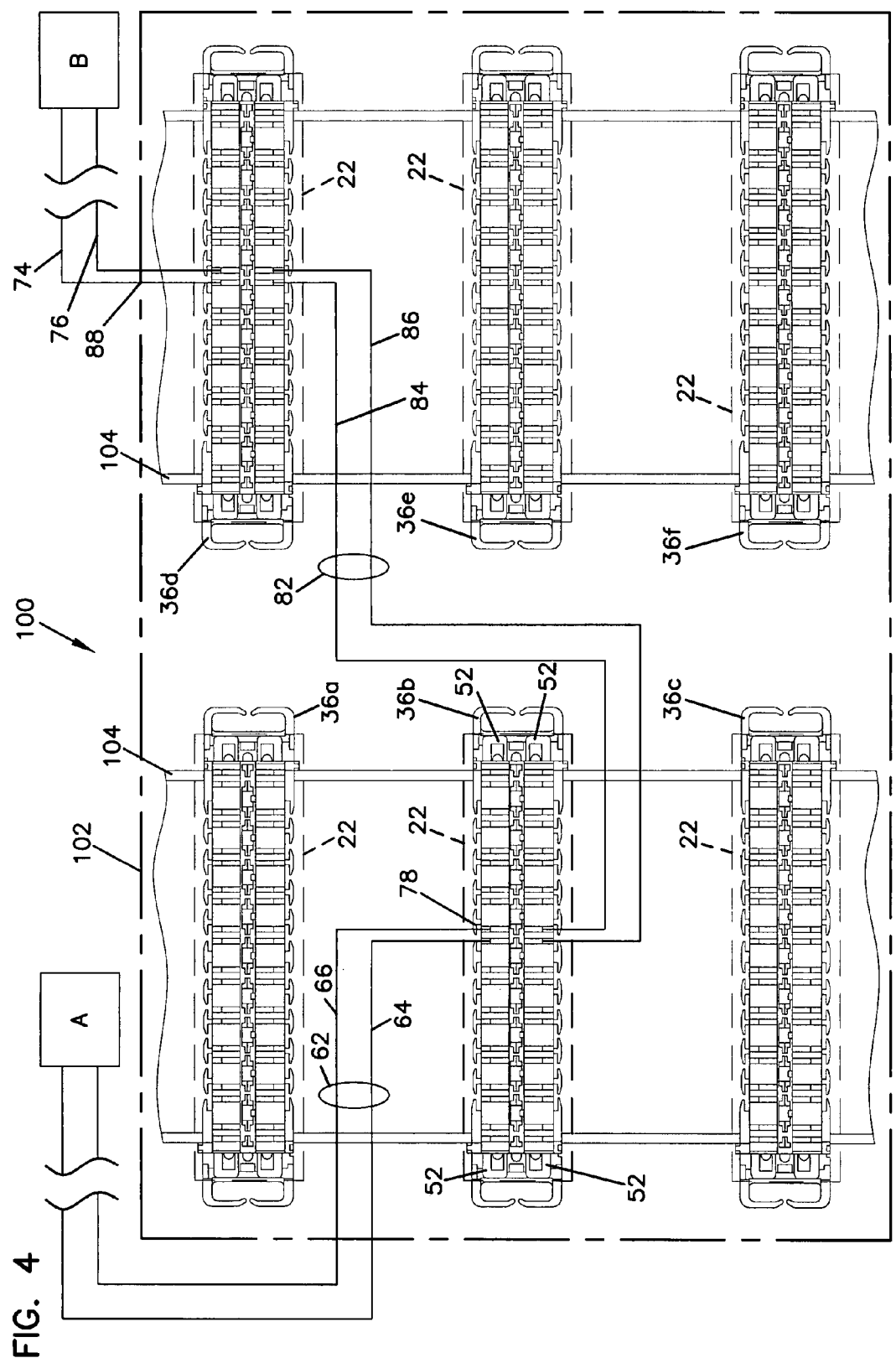

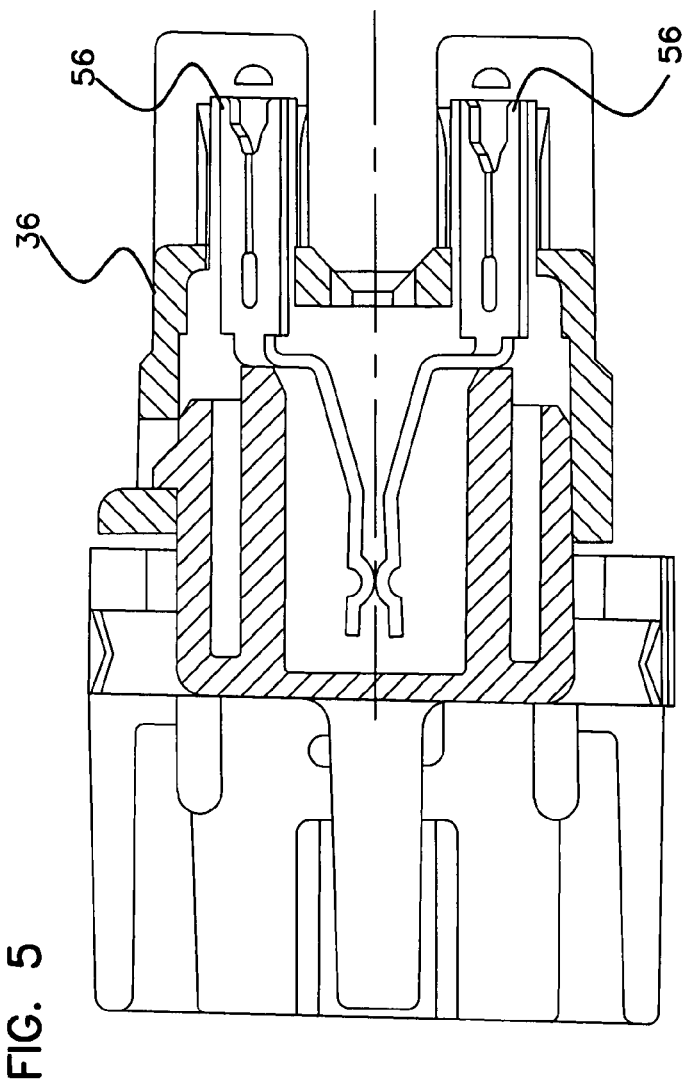
FIG. 5
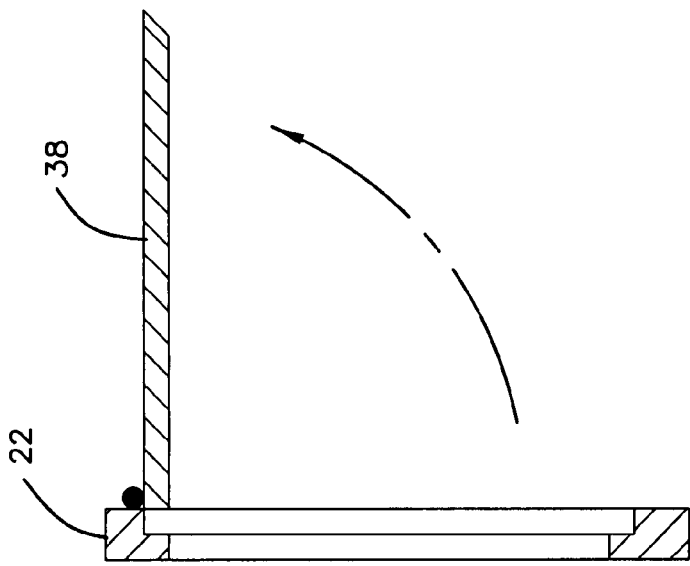
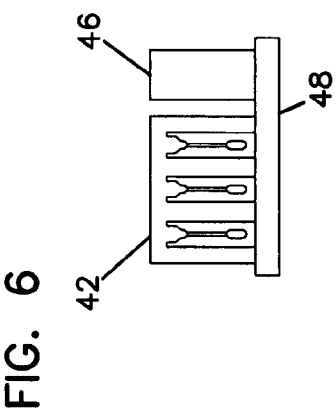
FIG. 6

INTELLIGENT PATCHING SYSTEM AND METHOD

CROSS REFERENCE TO RELATED APPLICATION

This application claims benefit of U.S. Provisional Patent Application Ser. No. 60/785,410, filed Mar. 22, 2006, which application is hereby incorporated by reference in its entirety.

FIELD OF THE INVENTION

The present invention relates to a telecommunications network including telecommunications cables and a connection management system.

BACKGROUND OF THE INVENTION

Telecommunications networks often involve hundreds of interconnections between telecommunications equipment. Often the interconnections include cabling connecting the equipment together. In some systems, patch cables are used to link connection devices, such as connection jacks, modules or blocks, linked to the telecommunications equipment. There is a need for improved telecommunications networks wherein the connections between equipment, specifically the patch cables, can be managed to allow easier system management of the numerous cables.

SUMMARY

The present invention relates to a telecommunications network manager including a network scanner, a scanner interface unit, and intelligence activation units. The intelligence activation units are used with cable connection modules including insulation displacement contacts for connecting to cables. The intelligence activation units provide visual signals to a technician about which cable connection modules should be accessed during system set up or system maintenance.

BRIEF DESCRIPTION OF THE DRAWINGS

FIG. 3A is a schematic front view of one of the intelligence activation units of FIG. 1.

FIG. 3B is a schematic top view of the intelligence activation unit of FIG. 3A mounted to a cable connection module.

FIG. 4 is a schematic view of a telecommunications network showing a plurality of the intelligence activation units and the cable connection modules of the type shown in FIG. 3B.

FIG. 5 is a cross-sectional side view in greater detail of the intelligence activation unit and the connection module of FIG. 3B.

FIG. 6 is a schematic side view of one of the circuit modules located on the intelligence activation unit.

DETAILED DESCRIPTION OF THE PREFERRED EMBODIMENT

Figure 1:
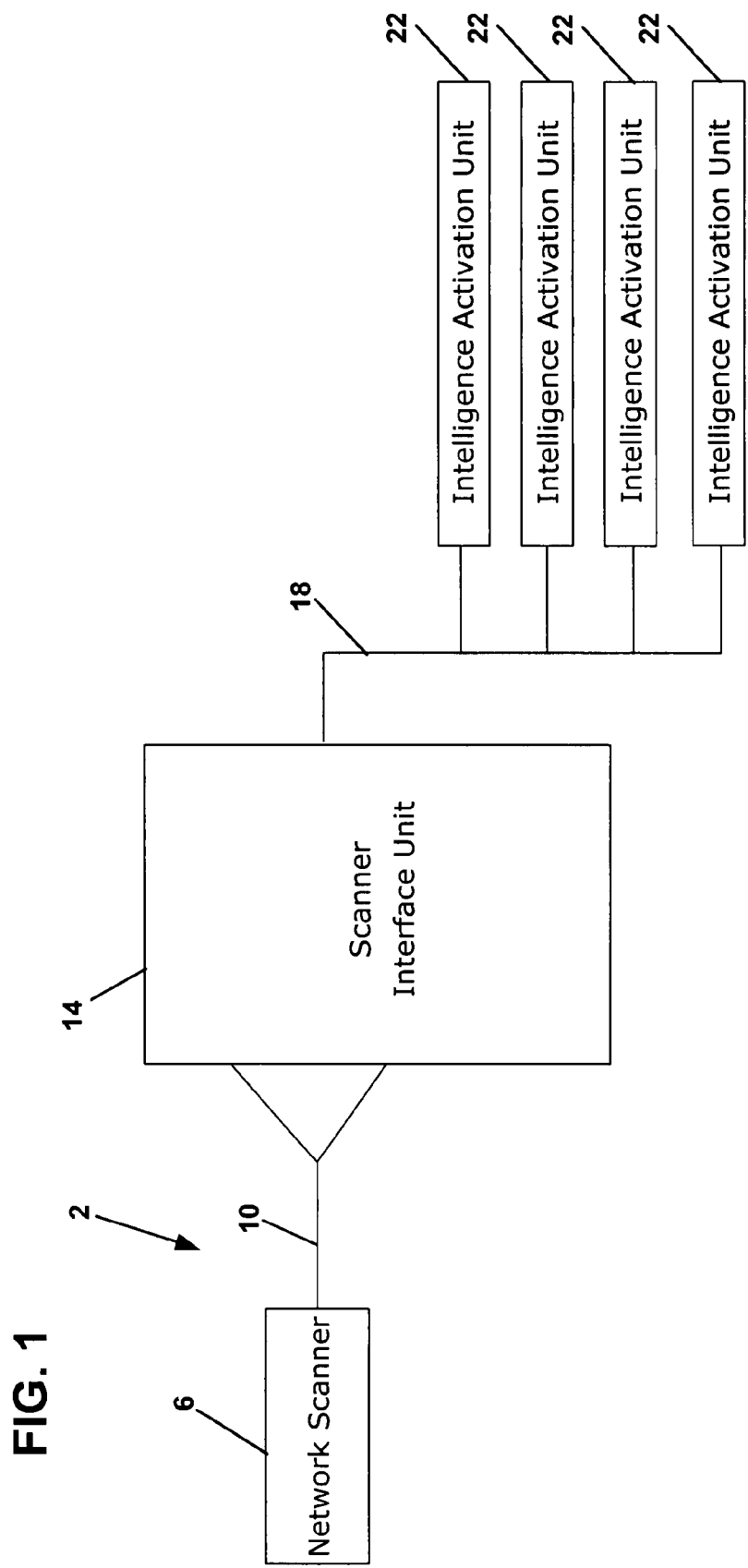
FIG. 1 is a schematic view of a telecommunications network manager for managing telecommunications patch cables.

Referring now to FIG. 1, a telecommunications network manager 2 is shown for use in managing telecommunications cables. Specifically, network manager 2 can be used to manage cabling, such as patch cables, extending between cable connection devices, such as cable connection jacks, modules or blocks. One example connection device is a connection module 36 (see FIG. 5) with insulation displacement contacts 56 (IDC's) for connecting cables as shown in U.S. Pat. No. 5,494,461, the disclosure of which is hereby incorporated by reference. Network manager 2 can send visual indications to a technician about which connection devices should be accessed.

Network manager 2 includes a network scanner 6 connected to one or more scanner interface units 14 by an electrical connection 10. Network scanner 6 manages the data and signaling associated with manager 2 for managing the cables connecting the equipment. Scanner interface unit 14 performs a condensing function for condensing multiple signal lines into a fewer numbers of lines. Scanner interface unit 14 includes electrical connections 18 connected to intelligence activation units 22 which are used with the cable connection modules 36, such as the type described above in U.S. Pat. No. 5,494,461. Electrical connections 10 can be in the form of ribbon cables. Electrical connections 18 can be in the form of multi-core cables including conductive wires.

Network manager 2 can be used during initial network system setup to make the connections between equipment. Also, network manager 2 can be added to an existing system of cable connection modules without disruption of the connection modules or the cables connected thereto. The network manager 2 is used to manage the connections between equipment, such as advising a technician which connection to access when a change is desired.

Figure 2:
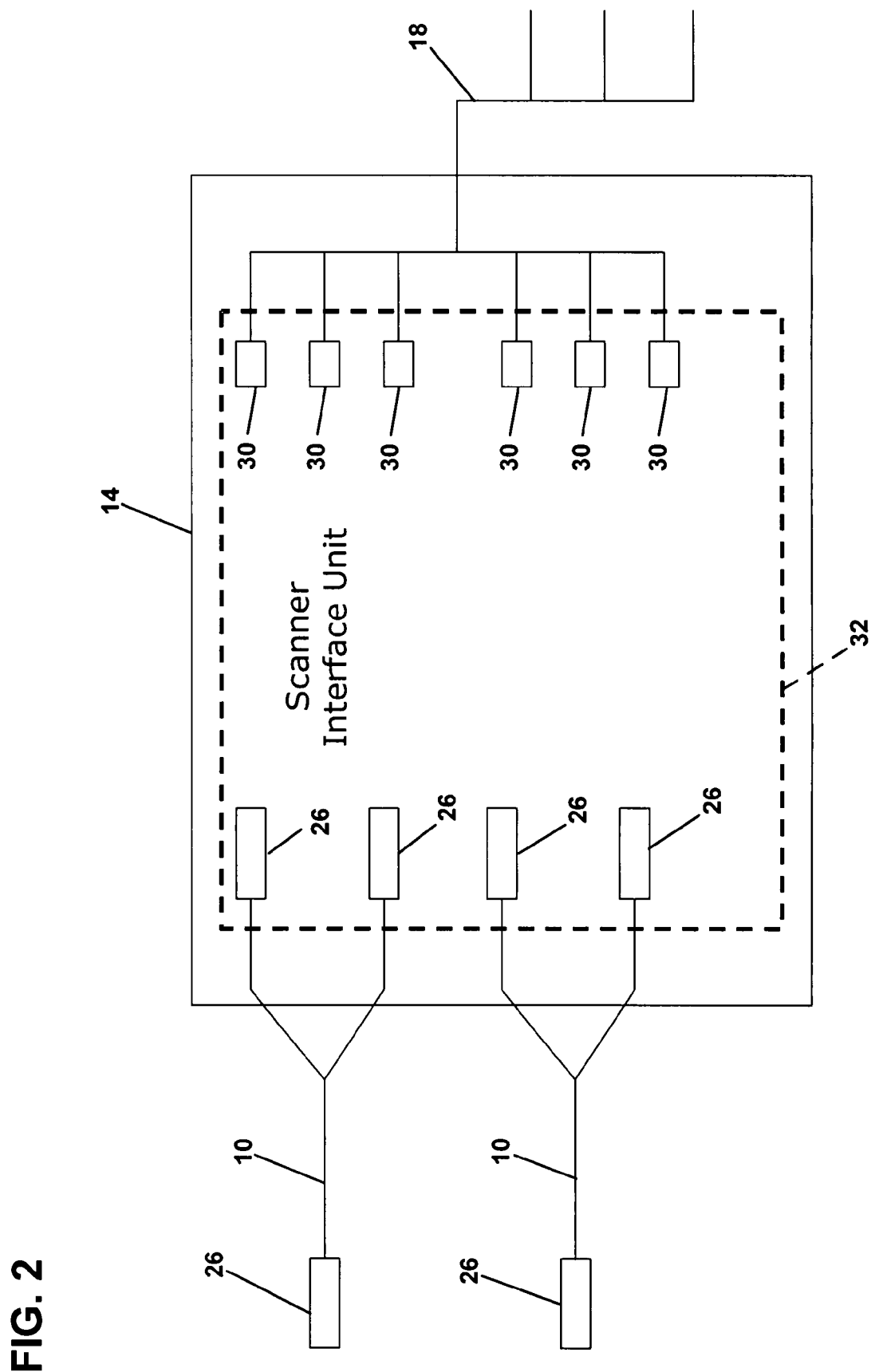
FIG. 2 is a schematic view of the scanner interface unit of the network manager of FIG. 1.

As shown in FIG. 2, scanner interface unit 14 can include one or more ribbon cable connections 26 for linking signals from scanner interface unit 14 to network scanner 6. Scanner interface unit 14 connects to the intelligence activation units 22 with connectors 30, such as punch down connectors. Circuit board 32 can include the necessary circuitry including switching diodes to link ribbon cable connections 26 to connectors 30.

Referring now to FIGS. 3A, 3B intelligence activation unit 22 mounts adjacent to cable terminations on a connection module 36. Posts 50 mount into recesses 52 of connection modules 36. As will be described below, access panel 38 allows for selective access to the cable terminations on connection module 36. Access panel 38 also provides a labeling surface or surfaces if desired.

Intelligence activation unit 22 includes at least one connector 42 for connecting to scanner interface unit 14. In one embodiment, connector 42 is a punch down connector. Intelligence activation unit 22 also includes a visual indicator, such as a LED 46, for providing a visual indication to a technician accessing the network.

Referring now to FIG. 4, various connection modules labeled 36a-f, constructed like module 36, are shown in a telecommunications network 100. Example equipment A is connected to example equipment B through a connection panel 102 including the plurality of connection modules 36a-36f. Modules 36a-36f can be rack mounted or rod mounted on a rack or rod system 104. As noted above, connection modules 36a-f can be constructed in accordance with the connection modules disclosed in U.S. Pat. No. 5,494,461. In FIG. 4, the intelligence activation units 22 are shown in dashed lines to enable viewing of the features of connection modules 36a-f. If a technician desires information about a connection, scanner 6 can activate LED's 46 on the relevant intelligence activation units 22 to advise the technician which intelligence activation units 22 and the underlying connection modules 36 need accessing.

Network 100 may include one hundred to five hundred or more connection modules 36. Only six are shown in FIG. 4. Keeping track of the connections between modules 36 is possible with a written log. However, an advantageous system results when network manger 2 and intelligence activation units 22 are used with connection modules 36 in panel 102.

Referring now to FIG. 5, one of connection modules 36 is shown with an intelligence activation unit 22 positioned adjacent to wire terminations 56. Access panel 38 pivots from a closed position to an open position as shown in FIG. 5, to allow access to wire terminations 56 without removal of intelligence activation unit 22. Wire terminations 56 are in the form of IDC's. In some networks, the wires connecting the equipment are twisted pairs. In connection module 36, the wire terminations are paired together to form a port. Wire pairs between two cables are connected to each other through connection module 36.

Wire terminations 56 of two modules 36 can be utilized to connect equipment A to equipment B as shown in FIG. 4. For example, wires 64, 66 of a first cable 62 connect equipment A to connection module 36$b$ at a first port 78. Equipment B is connected to connection module 36$d$ with wires 74, 76 of a second cable 72 at a second port 88. A patch cord or cable 82 with wires 84, 86 connects port 78 of connection modules 36$b$ to port 88 of connection module 36$d$.

As shown in FIGS. 4 and 5, intelligence activation units 22 are similarly sized in height and width to connection modules 36, making retrofitting an option without changing the mounting of connection modules 36. In the preferred arrangement, the only circuitry associated with intelligence activation units 22 is a small circuit board 48 including punch down connector 42 and LED 46 (see FIG. 6). The remaining circuitry associated with the manager is located on scanner interface unit 14. Scanner interface unit 14 can also be rack or rod 104 mounted with connection modules 36. In the example embodiment, each intelligence activation unit 22 includes two punch down connectors 42, and two LED's 46, one for each 4-pair circuit managed by network manager 2.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A telecommunications network management system comprising:
    a network scanner;
    a plurality of separate activation units connected to the network scanner, each activation unit including a visual indicator;
    a plurality of telecommunication connection blocks; and
    a plurality of twisted wire pairs connecting selected ones of the connection blocks to define a plurality of block connections;
    wherein the activation units are separate units and are mounted adjacent to the connection blocks, wherein each activation unit includes a frame defining an opening, and a hinged cover positioned in the opening to provide selective access to a corresponding telecommunication connection block;
    wherein the network scanner is configured to manage the block connections; and
    wherein the network scanner controls the visual indicators of the activation units to display the block connections.

2. The system of claim 1, further comprising a scanner interface unit connecting the network scanner to each of the activation units, wherein the connection between the network scanner and the scanner interface unit includes a ribbon cable.

3. The system of claim 2, wherein the connection between the scanner interface unit and the activation units includes at least one multi-core cable including a plurality of wires.

4. The system of claim 3, wherein the scanner interface unit includes:
    a plurality of ribbon cable connectors;
    a plurality of punch down wire connectors;
    a circuit board connecting the ribbon cable connectors to the punch down wire connectors.

5. The system of claim 2, wherein the scanner interface unit includes:
    a plurality of ribbon cable connectors;
    a plurality of punch down wire connectors;
    a circuit board connecting the ribbon cable connectors to the punch down wire connectors.

6. The system of claim 1, wherein
    the hinged cover positioned in the opening is sufficiently sized to cover multiple ports of the corresponding telecommunication connection block.

7. The system of claim 6, wherein the frame of each activation unit includes:
    the visual indicator;
    a punch down wire connector connected to the visual indicator.

8. The system of claim 7, wherein the frame of each activation unit includes:
    two visual indicators;
    two punch down wire connectors, each punch down wire connector connected to one of the visual indicators.

9. The system of claim 1, wherein each connection block includes:
    a body including a front;
    a plurality of conductive connections accessible from the front, the conductive connections arranged in at least one line.

10. The system of claim 9, wherein each connection block includes eight pairs of conductive connections in the at least one line.

11. A method of network management comprising:
    providing a plurality of telecommunication connection blocks mounted in a panel and connected to each other in pairs by conductive block connections;
    mounting an activation unit to each connection block;
    pivoting open a hinged cover of each activation unit to access the respective connection block;
    connecting each activation unit to a control system;
    sending a signal to one of the activation units from the control system;
    displaying a visual indicator on the activation unit in response to receipt of the signal from the control system.

12. A telecommunications connection block comprising:
    a twisted pair connector body including a housing and conductive insulation displacement connectors for connecting to twisted pair wires;
    a frame separately mounted to the body, the frame including a visual indicator and a control signal connector;
    a panel moveably mounted to the frame to cover the conductive insulation displacement connectors, the panel being configured to be moved without moving the visual indicator.

13. A telecommunications network management system comprising:
- a network scanner;
- a plurality of separate activation units connected to the network scanner, each activation unit including a visual indicator;
- a scanner interface unit connecting the network scanner to each of the activation units;
- a rack;
- a plurality of telecommunication connection blocks mounted to the rack, wherein each connection block includes:
  - a body including a front;
  - a plurality of conductive connections accessible from the front, the conductive connections arranged in a line, wherein each connection block includes at least eight pairs of conductive connections;
- a plurality of twisted wire pairs connecting selected ones of the connection blocks to define a plurality of block connections;
- wherein the activation units are separate units and are mounted to the connection blocks adjacent to the front of each body, wherein each activation unit includes a cover that moves between a closed position covering the conductive connections of the telecommunications block and an open position allowing access to the conductive connections;
- wherein the network scanner includes a database corresponding to the block connections;
- wherein the network scanner controls the visual indicators of the activation units to display the block connections.

14. The system of claim 13, wherein the connection between the network scanner and the scanner interface unit includes a ribbon cable.

15. The system of claim 14, wherein the connection between the scanner interface unit and the activation units includes multi-core cables.

16. The system of claim 15, wherein the scanner interface unit includes:
- a plurality of ribbon cable connectors;
- a plurality of punch down wire connectors;
- a circuit board connecting the ribbon cable connectors to the punch down wire connectors.

17. The system of claim 13, wherein each activation unit includes:
- a frame defining a central opening;
- a rear connection for connecting to the front of the body of the connection block;
- wherein the cover is a hinged cover positioned in the central opening.

18. The system of claim 17, wherein the frame of each activation unit includes:
- the visual indicator;
- a punch down wire connector connected to the visual indicator.

19. The system of claim 18, wherein the frame of each activation unit includes:
- two visual indicators;
- two punch down wire connectors, each punch down wire connector connected to one of the visual indicators.

20. The system of claim 13, wherein the conductive connections include insulation displacement connectors.

* * * * *